United States Patent Office 2,846,472
Patented Aug. 5, 1958

2,846,472
PROCESS FOR MAKING ORGANIC SULFONYL FLUORIDES

George Van Dyke Tiers, St. Paul, Minn., assignor to Minnesota Mining and Manufacturing Company, St. Paul, Minn., a corporation of Delaware No Drawing. Application June 29, 1956
Serial No. 595,013

11 Claims. (Cl. 260—543)

The invention relates to a new and useful process for making organic compounds possessing fluorosulfonyl groups ($-SO_2F$) and more particularly relates to a process for making chlorinated organic sulfonyl fluorides as addition products of the free-radical-initiated reaction of olefinic compounds with sulfuryl chlorofluoride.

Generally, the invention relates to my discovery of an addition undergone by sulfuryl chlorofluoride in the free-radical-initiated reaction thereof with olefinic compounds, which addition is fundamentally different from that undergone by fluorine-free sulfuryl halides in the free-radical-initiated reaction thereof with corresponding olefinic compounds in that the fluorine-sulfur bond remains intact. The free-radical-initiated addition reaction of fluorine-free sulfuryl halides with olefinic compounds is typified by the reaction of sulfuryl chloride with an olefinic compound, wherein addition occurs in either one of two ways. One way is represented by the addition of the chlorine substituents of the sulfuryl chloride to the olefinic compound with the evolution of free sulfur dioxide. The other way is represented by the reaction of one mol of sulfuryl chloride with two mols of olefinic compound to form a dichloro-substituted organic sulfone. In either event, complete cleavage of the $SO_2Cl_2$ occurs between the halogen and sulfur atoms.

I have discovered, however, that the free-radical-initiated reaction of sulfuryl chlorofluoride with an olefinic compound yields stable mono-chloro-substituted organic sulfonyl fluorides as addition products of the reaction. Cleavage of the $SO_2FCl$ occurs between the sulfur and chlorine atoms and the sulfur to fluorine bond remains intact.

Accordingly, an object of the invention is to provide a new and useful method for making useful, stable, mono-chloro-substituted organic sulfonyl fluorides by the free-radical-initiated reaction of sulfuryl chlorofluoride with olefinic compounds.

Another object of the invention is to provide a new and useful method for making useful intermediates for fluorination according to the electro-chemical fluorination process of Brice and Trott described in U. S. Patent No. 2,732,398.

Another object is to provide a method for making new and useful chloro-substituted polyfluoroalkane sulfonyl fluorides.

Other objects and advantages will become apparent as the description proceeds.

The addition reaction of the invention is illustrated in simplified form by the reaction equation

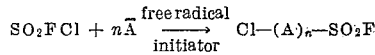

wherein $\overline{A}$ is an olefinic monomer unit, $(A)_n$ is a divalent radical, wherein A is an olefinic monomer residue and $n$ is an integer representing the number of mols of olefinic monomer reacted with the sulfuryl chlorofluoride, and, consequently, the number of olefinic monomer residues linked or valence bonded to one another in the formation of the divalent radical.

It is believed the reaction of the olefinic compound and the sulfuryl chlorofluoride proceeds by the formation of a fluorosulfonyl free-radical ($*SO_2F$) from the sulfuryl chlorofluoride under the influence of the free-radical-initiator. The fluorosulfonyl free radical then attacks the ethylenic linkage of the starting olefinic compound (ethylene being chosen as the starting compound for the purpose of illustration) to form an ethano-sulfonyl fluoride free radical ($*CH_2-CH_2-SO_2F$). The ethano-sulfonyl fluoride free radical, being relatively unstable, reacts further in either or both of two ways: it can abstract a chlorine atom from a further molecule of sulfuryl chlorofluoride giving a 1:1 adduct,

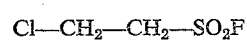

$$Cl-CH_2-CH_2-SO_2F$$

or it can attack a further molecule of olefinic compound to give a diethano-sulfonyl fluoride free radical

$$(*[CH_2-CH_2]_2-SO_2F)$$

which then has similar alternatives available. Usually both alternatives occur to some degree and the addition products are mixtures of 1:1, 2:1, 3:1, etc., adducts, the values of the subscript $n$ of the general formula

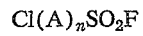

$$Cl(A)_nSO_2F$$

being 1 in the case of 1:1 adducts, 2 in the case of 2:1 adducts, etc. At some point, however, the reaction is stopped by the abstraction of chlorine from sulfuryl chlorofluoride.

The abstraction of chlorine must compete with any tendency for the starting olefinic compound to homopolymerize. Where this tendency is zero or small the yield of mono-(1:1) or desired telomeric adducts may be favored at the expense of unwanted higher polymers by the simple expedient of varying the relative concentration of the reactants. On the other hand, for specific uses (adhesives, etc.) it may be desirable to make high-polymeric products having a low content of $-SO_2F$ groups, and in such cases advantage may be taken of homopolymerization tendencies to provide elastomeric or resinous masses.

The free radical initiator for the reaction may be any catalyst for free-radical polymerization, examples of which are actinic radiation such as ultraviolet light, an organic peroxide, or hydroperoxide, an aliphatic azo compound, etc., the choice of any particular free-radical initiator being one of convenience for each particular synthesis. When an organic peroxide, hydroperoxide, or aliphatic azo compound is utilized as the free-radical-initiator, superior yields and conversions are obtained when its concentration is in the range of about 1–15%, based on the total weight of the sulfuryl chlorofluoride and olefinic monomer in the reaction mixture.

Olefinic compounds suitable for use in the practice of the invention have been found to be all those which copolymerize with sulfur dioxide. L. L. Ryden, F. J. Glavis, and C. S. Marvel, in the "Journal of the American Chemical Society," vol. 59, (1937), pages 1014–1015, and C. M. Suter, "Organic Chemistry of Sulfur," John Wiley & Sons (1944), pages 757–61, set forth in some detail olefins which copolymerize with $SO_2$. The pertinent pages specified of the publications noted in the preceding sentence are incorporated herein by reference. Included among the olefins copolymerizable with $SO_2$ and thus suitable in the practice of the invention are simple olefins such as ethylene, propylene, butene, vinyl chloride, vinyl bromide, allyl chloride, etc. as well as more complex olefins such as cyclohexene, cyclopentene, 1,3-dienes, undecylenic acid, and the methyl ester thereof, undecylenic alcohol, allyl acetic acid, N-allyl acetamide, methyl allyl ether, ethyl allyl ether, phenyl allyl ether, diallyl ether, styrene, ortho-allyl anisole, ortho-allyl phenol, and para-bromo allyl benzene. Unsuitable olefins are those which have the ethylenic linkage conjugated with carbonyl groups such as ethyl crotonate, crotonaldehyde, methyl acrylate, methyl vinyl ketone, and acrolein. Specific olefins which are unsuitable are allyl bromide, crotyl bromide, and tetramethyl ethylene. Although the Ryden, Glavis and Marvel article, supra, indicates that the tetra-substituted olefins do not copolymerize with $SO_2$, later work shows that for fluorinated olefins this is not the case and the copolymerization of tetrafluoroethylene with $SO_2$ is described in detail in U. S. Patent No. 2,411,722.

Experimental evidence indicates that olefinic compounds which copolymerize with sulfur dioxide to give polymeric molecules having a high molar ratio of reacted olefinic monomer to sulfur dioxide, do also in the practice of this invention favor the production of addition products having large $n$ values in the general formula $Cl-(A)_n-SO_2F$.

The invention provides a highly desirable method for making simple monoadducts wherein one mol of olefinic monomer residue is reacted with each mol of sulfuryl chlorofluoride, and the value of $n$ in the general formula $Cl-(A)_n-SO_2F$ is unity, as well as telomers wherein the average value of $n$ is from two to about 150.

By "telomers" is meant products having a carbon to carbon bond and corresponding to the formula $Y(A)_nZ$ as defined generally in U. S. Patents 2,457,229 and 2,440,800. In the present case, $(A)_n$ of the general telomeric formula is a divalent radical, wherein A is an olefinic monomer residue and $n$ is an integer greater than 1; Y is the chlorine and Z is the fluorosulfonyl fragment of the sulfuryl chlorofluoride attached terminally to the chain of olefinic monomer residues.

The free-radical initiated reaction of aliphatic mono-olefinic compounds and particularly the hydrocarbon mono-olefins such as ethylene, propylene, butene-1, iso-butylene, octene-1, octene-2, etc. with sulfuryl chlorofluoride favors the production of monomeric and telomeric adducts wherein the value of $n$ in the general formula is usually from 1 to 3 and seldom higher than 15. These aliphatic monoolefins generally provide high yields of chloro-substituted alkanesulfonyl fluorides which are useful intermediates in the formation of surface active agents, water repellent impregnants and coatings, and backsizes, as well as other products, the chlorine substituent providing a reactive center for the attachment of other substituents to the alkanesulfonyl fluorides. Consequently, the aliphatic hydrocarbon monoolefins form a preferred class of starting olefinic monomers in the practice of the invention.

Another preferred class of starting olefinic monomers are the polyfluoroethylenes such as 1,1-difluoroethylene, 1,1-difluoro,2-chloroethylene, 1,1-difluoro - 2,2-dichloroethylene, trifluoroethylene, trifluorochloroethylene and tetrafluoroethylene, the present invention providing a convenient method for making useful omega-chloro-substituted polyfluoroalkanesulfonyl fluorides of varying chain lengths wherein the values of $n$ in the general formula $Cl(A)_nSO_2F$ range from 1 to about 150. Generally telomers are produced wherein the average values of $n$ are greater than unity.

To favor the production of mono- and shorter chain telomeric adducts over longer chain telomeric adducts it is generally only necessary to vary the relative molar concentration of the starting reactants by increasing the molar ratio of the sulfuryl chlorofluoride to olefinic monomer. Where there is a strong tendency for the olefinic monomer to homopolymerize, the molar ratio of sulfuryl chlorofluoride to olefinic monomer must in general be greater than when the homopolymerization tendency of the starting olefinic monomer is weak. Conveniently, with aliphatic monoolefins, the ratios of sulfuryl chlorofluoride to starting olefinic monomer of from 1:10 to 10:1 are effective to control the compositions of the addition products wherein the values of $n$ range from 1 to about 15. Greater or smaller ratios than those indicated may be used without adversely affecting the reaction. With the polyfluoroethylenes, which have a strong tendency to homopolymerize in the presence of a free radical initiator, molar ratios of sulfuryl chlorofluoride to starting olefinic monomer of from 1:10 to 50:1 are effective to control the addition product compositions. Here again, however, greater or smaller ratios do not adversely affect the reaction.

The process admits of either batch or continuous processes. No particular apparatus is necessary to the practice of the invention; however, the apparatus should be immune to attack by the reactants or the reaction products. Of course, where actinic radiation such as ultraviolet light is used as the free radical initiator, suitable provision must be made for irradiating or illuminating the interior of the reaction vessel. The reaction may conveniently be carried out at temperatures ranging from —100 to 250° C. Usually, the reaction is carried out in the temperature range of from 25 to 200° C.

A suitable apparatus for carrying out batch operations is a stainless steel or "Monel" (registered trademark of International Nickel Company for nickel-copper alloy) kettle which with withstand pressures on the order of 100–1000 p. s. i. g. The kettle is first evacuated, then charged with sulfuryl chlorofluoride and a free-radical initiator such as benzoyl peroxide. The starting olefinic monomer is then added slowly, an autogenous rise being observable in the internal temperature and pressure of the kettle. Both the temperature and pressure then fall and completion of the reaction is usually indicated by a relatively constant pressure after a more or less steady pressure drop. Thus, for the desired reaction to proceed it is only necessary that the reactants be mixed together at reaction temperature in the range of —100 to 250° C. in the presence of a free-radical initiator of the class described. The addition product of the reaction is then easily separated into its monomeric and/or telomeric fractions by fractional distillation.

The following specific examples will serve to further illustrate the principles of the invention without, however, restricting the invention thereto.

*Example 1*

Into a dry, chilled 180 ml. autoclave was placed 45 g. $SO_2FCl$ and 4 grams ditertiary-butyl peroxide. Approximately 27 g. gaseous ethylene was pumped into the autoclave at room temperature (1:2.5 mol ratio $SO_2FCl$ to ethylene) and the autoclave was sealed, then heated to 130° C. for approximately one-half hour. Thereafter, the temperature of the autoclave was maintained at about 100° C. for 14 hours. The autoclave was then cooled to room temperature and vented, giving 62 grams liquid product, which upon fractional distillation yielded the following identified fractions:

(1) 37.1 g. $Cl(C_2H_4)_2SO_2F$; B. P. 125° C., 20 mm. Hg, $n_D^{25}$ 1.4369—

Calculated: percent Cl, 20.3; percent C, 27.5; percent F, 10.9.

Found: percent Cl, 20.1; percent C, 27.7; percent F, 10.8.

(2) 11.8 g. $Cl(C_2H_4)_3SO_2F$; B. P. 154° C., 20 mm. Hg; $n_D^{25}$ 1.4410—

Calculated: percent Cl, 17.5; percent C, 35.7; percent F, 9.4.

Found: percent Cl, 17.5; percent C, 35.8; percent F, 9.3.

From another ethylene run carried out in a manner similar to the foregoing, there was obtained 3.2 g. of a fraction boiling at 75° C. at 20 mm. Hg, which was apparently a mixture of ClC$_2$H$_4$SO$_2$F and Cl(C$_2$H$_4$)$_2$SO$_2$F as indicated by the quantitative analysis of the fraction:

Calculated for ClC$_2$H$_4$SO$_2$F: percent Cl, 24.2; percent C, 16.4; percent F, 12.9. Found: percent Cl, 24.3; percent 20.5; percent F, 11.8. Calculated for $$Cl(C_2H_4)_2SO_2F$$

percent Cl, 20.3; percent C, 27.7; percent F, 10.9

*Example 2*

A clean, dry 180 ml. autoclave, chilled to about −50° C. was charged with 70.3 g. cold liquid SO$_2$FCl, 40.0 g. cold, liquid propylene (1:1.6 mol ratio) and 5.0 g. benzoyl peroxide, care being taken to avoid moisture contamination. The autoclave was sealed, and heated to 85° C. for 14 hours. The autoclave was then cooled to room temperature and vented into a trap system. There was obtained 105.7 g. liquid product which upon fractional distillation gave the following:

(1) 41.8 g. ClCH—CH$_2$SO$_2$F; B. P. 72°C. at 20 mm. Hg; $n_D^{26}$ 1.4220—
  |
  CH$_3$

Calculated: percent Cl, 22.1; percent C, 22.2; percent F, 11.8.
Found: percent Cl, 21.3; percent C, 23.2; percent F, 11.6.

(2) 53.5 g. Cl(CH—CH$_2$)$_2$SO$_2$F; b. p. 128°C. at 20 mm. Hg; $n_D^{26}$ 1.4394—
  |
  CH$_3$

Calculated: percent Cl, 17.5; percent C, 35.7; percent F, 9.4.
Found: percent Cl, 17.3; percent C, 36.0; percent F, 8.8.

The fractions (1) and (2) represent an SO$_2$FCl conversion to product of 88.7%, and a propylene conversion to product of 93.1%.

*Example 3*

A mixture of 92.0 g. cold liquid SO$_2$FCl, 31.5 g. cold liquid isobutylene (1.4:1 mol ratio), and 3.0 g. benzoyl peroxide was charged in a "Dry Ice" chilled 180 ml. autoclave and subjected to the procedure set forth in the preceding example. There was obtained 84.3 g. liquid product, which upon fractional distillation yielded the following:

CH$_3$
          |
(1) 68 g. Cl—(C—CH$_2$)—SO$_2$F; B. P. 103°C. at 80 mm. Hg; $n_D^{25.5}$ 1.4256–
          |
         CH$_3$

Calculated: percent Cl, 20.3; percent F, 10.8.
Found: percent Cl, 19.7; percent F, 12.3.

CH$_3$
          |
(2) 4 g. Cl—(C—CH$_2$)$_2$—SO$_2$ F; B. P. 137°C.; at 20 mm. Hg; $n_D^{25.5}$
          |
         CH$_3$
1.4420.

Fractions (1) and (2) represent an SO$_2$FCl conversion to product of 52.4% and of isobutylene to product of 76.4%.

The experiment was repeated using 40 g. SO$_2$FCl, 44 g. isobutylene (1:2.4 mol ratio), and 4.0 g. benzoyl peroxide. There was obtained 84.3 g. liquid product which separated upon fractional distillation into the following:

(1)            CH$_3$
                |
   42.2 g. Cl(C—CH$_2$)SO$_2$F
                |
               CH$_3$ (2)            CH$_3$
                |
   11.7 g. Cl(C—CH$_2$)$_2$SO$_2$F
                |
               CH$_3$ (3)            CH$_3$
                |
   11.0 g. Cl(C—CH$_2$)$_3$SO$_2$F
                |
               CH$_3$

The conversion of SO$_2$FCl to product was 98.4% and of isobutylene to product 57.7%.

*Example 4*

A mixture of 26.0 g. SO$_2$FCl, 19.7 g. butene-1 (1:1.6 mol ratio), and 2.0 g. benzoyl peroxide was reacted by the procedure described in the two preceding examples to give 44.2 g. liquid product. Upon fractional distillation the liquid product gave the following:

C$_2$H$_5$
        |
(1) 22 g. Cl(CH·CH$_2$)SO$_2$F; B. P. 118.5°C. at 80 mm. Hg; $n_D^{25}$ 1.4281—

Calculated: percent Cl, 20.3; percent F, 10.8.
Found: percent Cl, 20.0; percent F, 11.0.

C$_2$H$_5$
        |
(2) 15.0 g. Cl(CH·CH$_2$)$_2$SO$_2$F; B. P. 143° at 20 mm. Hg; $n_D^{25}$ 1.4487—

Calculated: percent Cl, 15.4; percent F, 8.25.
Found: percent Cl, 14.7; percent F, 7.5.

The conversion of SO$_2$FCl to product was 87.5%, and of butene-1 to product, 73.5%.

*Example 5*

To 6.0 (.051 mol) grams of sulfuryl chlorofluoride was added 7.0 (.0585 mol) grams of octene-1 (1:1.1 mol ratio) and the mixture sealed in an ampoule in vacuo. The sealed ampoule and its contents were exposed to ultraviolet radiation from a quartz-windowed mercury arc lamp for 15 hours at room temperature (approximately 25° C.) On opening the ampoule, no evolution of gaseous material was noted. The reaction mixture was distilled and a fraction of 8.6 grams of the adduct, FSO$_2$CH$_2$CHClC$_6$H$_{13}$, was obtained as a clear, mobile liquid having a boiling point of 158° C. at 40 mm. Hg; $n_D^{25}$ 1.4384. Analysis of the adduct showed it to contain 15.4% chlorine and 8.3% fluorine in agreement with the calculated values of 15.39% and 8.25% respectively. The structure was supported by infrared analysis, showing strong —SO$_2$F bands at about 7.2μ and 8.2μ.

*Example 6*

An ampoule was charged with 6.5 grams of sulfuryl chloro-fluoride (.055 mol), 15.1 grams of octadecene-1 (.052 mol) (1:1.2 mol ratio) and 0.5 gram of benzoyl peroxide and subsequently sealed in vacuo. The sealed ampoule containing this mixture was then heated at 85° C. for 16 hours while under agitation. Fractional distillation of the crude product gave 13.85 grams of slightly impure beta-chloro-octadecanesulfonyl fluoride. This compound after recrystallization from hexane had a B. P. of 185–190° C. at 0.4 mm. Hg and a M. P. of 41–42.5° C. The compound analyzed 9.4% chlorine and 5.7% fluorine as compared with calculated values of 9.45% and 5.15% respectively. The structure of the compound was further supported by infrared analysis.

*Example 7*

By the general procedure of Example 6, there was obtained from octene-2 an excellent yield of 2-chloro-1-methyl-heptane-sulfonyl fluoride, B. P. 137–140°/23 mm. Hg; $n_D^{25}$ 1.4406. The compound analyzed 15.1% fluorine in agreement with the calculated value of 15.45%. The structure of the compound was further supported by infrared analysis.

Following the procedure of the preceding examples, the following ethylenic compounds were reacted with SO₂FCl to yield the indicated addition products.

| Example No. | Ethylenic Compound | Product Isolated | B. P., °C. | M. P., °C. | $n_D^{25}$ |
|---|---|---|---|---|---|
| 8 | Undecenoyl chloride | $Cl\text{---}[CH\text{---}CH_2]_1\text{---}SO_2F$ with $(CH_2)_8COCl$ branch | 176–179 at 4 mm. Hg | | 1.4627 |
| 9 | Allyl chloride | $Cl\text{---}[CH\text{---}CH_2]_2\text{---}SO_2F$ with $CH_2Cl$ branch | 108 at 15 mm. Hg | | |
| 10 | Diallyl ether | $Cl\text{---}[CH_2\text{---}CH_2]_1\text{---}SO_2F$ with $CH_2OCH_2CHClCH_2SO_2F$ branch | | 83.5–84 | |

The following example demonstrates the practice of the invention on a large scale more suitable for commercial exploitation than the previous examples.

*Example 11*

Charge A:
    10.88 lbs. technical (93%) SO₂FCl (10.1 lbs. pure; 0.085 lb. mols).
    .50 lb. benzoyl peroxide dissolved in
    5.00 lbs. zenzene
    10.4 lbs. octene-1 (97% mono olefin) (10.1 lbs.– 0.090 lb. mols).

26.78 lbs. total charge A

Charge B:
    1.5 lbs. octene-1 (97%: 1.56 lbs. or 0.013 lb. mols)
    .05 lb. benzoyl peroxide dissolved in
    .50 lb. benzene 2.05 lbs. total charge B
Total, charges A+B: 28.83 lbs.

A five-gallon "Monel" (nickel-copper alloy; registered trademark of International Nickel Company) metal kettle designed to operate at 100 p. s. i. g. was evacuated and then charged with all of A except for the octene-1. The temperature of the kettle was raised to 165° F. at which point the pressure was 74 p. s. i. g.

Octene-1 was added cautiously until an exothermic reaction was apparent by the rise of the internal temperature over that of the jacket. This occurred when about one pound had been added. The jacket was allowed to drop to 155° F. and the addition of octene continued at a rate to maintain an internal temperature of 190 to 195° F. The pressure dropped steadily, finally reaching 34 p. s. i. g. after 3½ hours. Charge B was added and the mixture was held for an hour. A small pressure drop occurred. The kettle was vented at 165° F. and drained while hot. The contents were a nearly colorless liquid, yielding 18 lbs. of 1:1 adduct and 3.1 lbs. of 2:1 adduct upon fractional distillation, representing almost 100% conversion.

The proposed structures were supported by infrared analysis of the respective compounds and in most cases, quantitative analysis for the halogen content.

Ease of control of the relative predominance of monoadducts and telomeric adducts to one another was evident in the addition products of the free-radical-initiated reaction of varying molar concentrations of butene-1 and sulfuryl chlorofluoride. When butene-1 and SO₂FCl were reacted in the molar ratio of 5.6:1 (butene-1 to SO₂FCl) the resulting addition product comprised 2 parts of 1:1 adduct to each 5 parts of 2:1 adduct; when reacted in 1:1 (butene-1 to SO₂FCl) molar ratio, the resulting addition product comprised 10 parts 1:1 adduct for each part 2:1 adduct; when reacted in the molar ratio of 1.6:1 (butene-1 to SO₂FCl) the resulting addition product yielded 2 parts 1:1 adduct for each part 2:1 adduct.

The average value of $n$ in any separated fraction of reaction product will under ordinary reaction conditions when using aliphatic hydrocarbon mono-olefins as starting monomers, probably not exceed 10–15, and will generally be in the range of 1 to 3.

The free radical initiated reaction of polyfluoroethylene with sulfuryl chlorofluoride is illustrated in the following examples. Here again, the direct and significant bearing of the relative molar concentration of the reactants on the composition of the addition products is very clearly illustrated. The telomers produced are useful intermediates for the preparation of water and/or oil repellants for paper and textiles, foaming agents, chemically stable electroplating additives and other compounds.

*Example 12*

In a 43 ml. autoclave was placed 10.0 g. $CH_2=CF_2$, 18.4 g. SO₂FCl (mol ratio 1:1) and 1.0 g. benzoyl peroxide. The autoclave was sealed and heated at 103° for two hours. The autoclave was vented at room temperature and there was recovered 12.1 g. of liquid and semisolid reaction products. From the great quantity of non-gaseous reaction product recovered, the conclusion is unavoidable that telomerization occurred. The average value of $n$ in the formula $Cl(CF_2CH_2)_nSO_2F$ was determined to be 4 by chlorine analysis of the total liquid product.

Calcd. for $Cl(CH_2CH_2)_4SO_2F$: 9.5% Cl. Found (total liquid product): 9.7% Cl.

The experiment was repeated on a larger scale. In a 180 ml. autoclave was placed 65 g. $CH_2CF_2$ and 58 g. SO₂FCl (mol ratio 2:1) and 4.0 g. benzoyl peroxide. After 15 hours at 80°, there was recovered a pasty reddish-brown reaction product which on drying to constant weight at 110° weighed 51.0 g. The average value of $n$ in the formula $Cl(CF_2CH_2)_nSO_2F$ was determined to be 5 by elementary analysis.

Calcd. for $Cl(CF_2CH_2)_5SO_2F$: 8.10% Cl, 7.30% S, 47.7% F. Found: 8.10% Cl, 7.45% S, 45.6% F. Infrared analysis showed the absence of SO₂FCl but the presence of an organic sulfonyl fluoride. From the position of the strong band due to the sulfonyl fluoride group (7.02μ), it is seen that this organic sulfonyl fluoride is intermediate in character between an alkyl sulfonyl fluoride and a perfluoroalkyl sulfonyl fluoride, as would be expected for the proposed formula.

*Example 13*

In a 43 ml. autoclave was placed 17 g. $CF_2CFCl$, 20.0 g. SO₂FCl (mol ratio 0.87:1) and 1.0 g. benzoyl peroxide. The autoclave was sealed and heated to 80° for 16 hours. The autoclave was vented at room temperature and there was recovered 12.3 g. of cream-colored powdery reaction product. By infrared analysis this was demonstrated to be other than the homopolymer of $CF_2CFCl$: a moderately weak band but characteristic of perhaloalkyl sulfonyl fluorides was found at 6.89μ which was not diminished in intensity even upon evacuation to 0.01 mm. Hg pressure at 200° C. The average value of $n$ in the formula $Cl(CFClCF_2)_nSO_2F$ was determined to be 110 by analysis of this product.

Calcd. for $Cl(CFClCF_2)_{110}SO_2F$: 30.3% Cl, 0.25% S. Found: 30.2% Cl, 0.25% S.

The experiment was repeated, using, however, only 5.0 g. of $CF_2CFCl$ and 29.0 g. $SO_2FCl$ (mol ratio 0.175:1) and 0.6 g. di-tertiary butyl peroxide. The autoclave was heated to 140° for 16 hours and vented at room temperature. A brown-colored stiff paste was recovered. By infrared analysis, this product was shown to have about five times as many sulfonyl fluoride groups per unit weight as had the previous product. The average value of $n$ in the formula $Cl(CFClCF_2)_nSO_2F$ was determined as 18 by analysis of this total product.

Calcd. for $Cl(CFClCF_2)_{18}SO_2F$: 30.3% Cl, 1.45% S. Found: 28.6% Cl, 1.41% S.

It is thus shown that a decrease in the mol ratio of olefin to $SO_2FCl$ does indeed, as expected, bring about a corresponding decrease in the average number of olefin units per telomer molecule.

*Example 14*

In a 180 ml. autoclave was placed 40 g. $SO_2FCl$, 5.2 g. $C_2F_4$ (mol ratio 7:1) and 0.7 g. di-tertiary-butyl peroxide (DTBP). The autoclave was sealed, and heated to 140–145° C. for 15 hours. The autoclave was then vented and a waxy solid recovered. The solid, after heating to 30° C. in vacuo to remove any DTBP decomposition products, showed an infrared band for $-SO_2F$ absorption at 6.85μ. The average value of $n$ in the formula $Sl(C_2F_4)_nSO_2F$ was determined to be between 4 and 5 by quantitative analysis.

Calcd. for $Cl(C_2F_4)_4SO_2F$: percent S, 6.17; percent Cl, 6.85. Found: percent S, 5.53; percent Cl, 6.7. Calcd. for $Cl(C_2F_4)_5SO_2F$: percent S, 5.17; percent C, 5.7.

*Example 15*

In a 180 ml. stainless steel autoclave was placed 59 g. $SO_2FCl$, 21.4 g. $C_2F_4$ (mol ratio 2.38:1) and 8.7 g. of di-tertiary-butyl peroxide. The autoclave was sealed and heated at 140–145° C. for 16 hours with constant shaking. The autoclave was vented at room temperature and there was recovered 19.5 g. of solid product. Upon heating in a sublimator at from 85–200° C., the solid reduced to a liquid fraction, two waxy sublimates and a powdery residue, all of which showed an infrared absorption band at 6.83–6.87μ, which is in the vicinity for $-SO_2F$ absorption. No elemental analysis of the liquid fraction was made because of the presence of hydrogen-containing impurities. The elemental analysis of the waxy sublimates and powdery residue was as follows:

| | Calcd. | Found |
|---|---|---|
| (1) Waxy sublimate, M. P. 115–135° C.: | | |
| $Cl(C_2F_4)_8SO_2F$, percent S | 3.48 * | |
| $Cl(C_2F_4)_9SO_2F$, percent S | 3.15 * | } 3.28 |
| (2) Waxy sublimate, M. P. 165–180° C.: | | |
| $Cl(C_2F_4)_{12}SO_2F$, percent S | 2.43 | 2.43 |
| (3) Powdery residue: | | |
| $Cl(C_2F_4)_{52}SO_2F$— | | |
| Percent S | 0.60 | 0.59 |
| Percent Cl | 0.67 | 0.68 |

The products of the examples may be converted to their corresponding sulfonic acids, metal and ammonium salts, acid chlorides, and sulfonamides.

For example utilizing the omega-chloro-perfluoro-alkanesulfonyl fluorides $(Cl(C_2F_4)_nSO_2F)$ as starting compounds, the corresponding sulfonic acids $$Cl(C_2F_4)_nSO_3H$$

can be prepared by first preparing the potassium or sodium salt $$Cl(C_2F_4)_nSO_3Na$$
$$Cl(C_2F_4)_nSO_3K$$

by hydrolysis of the sulfonyl fluoride in hot alkali solution, then decomposing the salt by treatment with strong acid, as by distillation from 100% sulfuric acid solution.

The metal and ammonium salts can be prepared by the reaction of the sulfonic acids with the metal, metal oxide, or ammonium hydroxide and can be represented generically by the formula $$[Cl(C_2F_4)_nSO_3]_mM$$

where M is a metal atom or ammonium group which replaces the hydrogen atom and $m$ is the number of sulfonyl groups bonded thereto, $m$ being unity for the salts of monovalent metals such as sodium and potassium.

The sulfonyl chlorides $$Cl(C_2F_4)_nSO_2Cl$$

can be prepared by reacting the sulfonic acid with $PCl_5$ or the salt with $$PCl_5 \cdot 2ZnCl_2$$

complex in approximately equal molar ratio.

The sulfonamides $$Cl(C_2F_4)_nSO_2NH_2$$

can be prepared by reacting the sulfonyl fluoride or chloride with liquid ammonia.

With actinic radiation as the free-radical-initiator, the reaction can be carried out at any temperature at which the olefinic reactant is liquid. Thus with ethylene, for example, the reaction may be carried out at a temperature as low as −100° C. at atmospheric pressure.

Having thus described the invention what is claimed as new is as follows.

I claim:

1. A process for making chloro-substituted organic sulfonyl fluorides which comprises reacting with one another in the presence of a free-radical-initiator, sulfuryl chlorofluoride and an olefinic compound copolymerizable with sulfur dioxide and recovering a chloro-substituted organic sulfonyl fluoride product.

2. The process of claim 1 wherein the olefinic compound is an aliphatic mono-olefin.

3. The process of claim 1 wherein the olefinic compound is an aliphatic hydrocarbon mono-olefin.

4. The process of claim 1 wherein the olefinic compound is a polyfluorinated mono-olefin.

5. The process of claim 1 wherein the olefinic compound is a polyfluorinated ethylene.

6. A process which comprises reacting with one another in the presence of a free-radical-initiator, sulfuryl chlorofluoride and an olefinic monomer copolymerizable with sulfur dioxide with the formation of an addition product of the formula $Cl-(A)_n-SO_2F$, wherein $(A)_n$ is a divalent radical in which A represents an olefinic monomer residue and $n$ is an integer of from 1 to about 150 representing the number of olefinic monomer residues valence bonded to one another, and recovering such addition product.

7. A process for making chloro-substituted organic sulfonyl fluorides which comprises reacting with one another in the presence of a free-radical-initiator, sulfuryl chlorofluoride and an aliphatic hydrocarbon mono-olefin, and recovering a chloro-substituted organic sulfonyl fluoride product.

8. A process for making chloro-substituted organic sulfonyl fluorides which comprises reacting with one another in the presence of a free-radical-initiator, sulfuryl chlorofluoride and a polyfluorinated ethylene, and recovering a chloro-substituted polyfluorinated alkane sulfonyl fluoride product.

9. A process of making chloro-substituted alkane sulfonyl fluorides which comprises reacting with one another in the presence of a free-radical-initiator, sulfuryl chlorofluoride and an aliphatic hydrocarbon mono-olefin, and recovering a chloro-substituted organic sulfonyl fluoride product.

10. A process which comprises mixing sulfuryl chlorofluoride and olefinic monomer copolymerizable with $SO_2$ with one another in the presence of a free-radical-initiator at a temperature range of from about $-100$ to about $250°$ C. with the formation of an addition product of the formula $Cl\text{-}(A)_n\text{-}SO_2F$, wherein $(A)_n$ is a divalent radical in which A represents an olefinic monomer residue and $n$ is an integer of from 1 to 150, and recovering such addition product.

11. A process which comprises mixing sulfuryl chlorofluoride and a polyfluoroethylene with one another under reaction conditions in the presence of a catalyst for free-radical polymerization and at a temperature of from about $-100°$ C. to about $250°$ C., with the resulting formation of a telomeric adduct having the general formula $Cl\text{-}(A)_n\text{-}So_2F$, wherein $(A)_n$ is a divalent radical in which A represents a polyfluoroethylene monomer residue and $n$ is an integer of from 2 to 150, and recovering such adduct.

References Cited in the file of this patent

UNITED STATES PATENTS 2,276,097   Salzberg _____ Mar. 10, 1942